US007190688B1

(12) United States Patent
Kamel et al.

(10) Patent No.: US 7,190,688 B1
(45) Date of Patent: Mar. 13, 2007

(54) METHOD AND APPARATUS FOR ADAPTIVE SETTING OF INITIAL TRAFFIC POWER

(75) Inventors: Raafat Edward Kamel, Westfield, NJ (US); Wen-Yi Kuo, Parsippany, NJ (US); Martin Howard Meyers, Montclair, NJ (US); Carl Francis Weaver, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/157,758

(22) Filed: Sep. 21, 1998

(51) Int. Cl.
*H04B 7/216* (2006.01)

(52) U.S. Cl. .................. 370/342; 370/335; 370/333; 370/332

(58) Field of Classification Search ............ 370/342, 370/347, 252, 335, 441, 442, 318, 332, 333, 370/320, 468, 465, 331, 321, 311, 317, 336, 370/350; 455/38.3, 516, 517; 375/130, 375/140, 134; 704/220, 221
See application file for complete search history.

(56) References Cited

U.S. PATENT DOCUMENTS

| 5,193,102 | A | * | 3/1993 | Meidan et al. ............ 375/132 |
| 5,245,629 | A | * | 9/1993 | Hall .............................. 375/1 |
| 5,559,789 | A | * | 9/1996 | Nakano et al. ............ 370/342 |
| 5,596,570 | A | * | 1/1997 | Soliman .................... 370/203 |
| 5,675,581 | A | * | 10/1997 | Soliman .................... 370/252 |
| 5,715,526 | A | * | 2/1998 | Weaver et al. ............ 455/126 |
| 5,771,461 | A | * | 6/1998 | Love et al. ................ 455/522 |
| 5,924,043 | A | * | 7/1999 | Takano ...................... 455/522 |
| 5,982,760 | A | * | 11/1999 | Chen ......................... 370/335 |
| 6,034,971 | A | * | 3/2000 | Love et al. ................ 370/468 |
| 6,070,086 | A | * | 5/2000 | Dobrica .................... 370/342 |
| 6,359,938 | B1 | * | 3/2002 | Keevill et al. ............ 375/316 |

* cited by examiner

*Primary Examiner*—Ajit Patel

(57) ABSTRACT

A method and apparatus that permits base stations to adaptively set initial power levels in forward link traffic channels (i.e., base station to mobile unit) based on an interference measure, where the interference measure is the difference between the base station transmitted pilot $E_C/I_O$ and the mobile unit received pilot $E_C/I_O$. The interference measure indicates how much interference is present from other base stations in the mobile unit's locale, mobile receiver noise and other similar sources. Call quality and system capacity are optimized since the initial power level is set in accordance with the interference environment. The method of the invention implements the adaptive setting by extracting the mobile unit received pilot $E_C/I_O$ from the access message transmitted by the mobile unit. The interference measure is then determined and used by the base station to set the initial power level in the forward link traffic channel.

25 Claims, 2 Drawing Sheets

METHOD AND APPARATUS FOR ADAPTIVE SETTING OF INITIAL TRAFFIC POWER

FIELD OF THE INVENTION

This invention relates to the field of wireless communications and in particular, to setting initial power levels in the forward link traffic channels.

BACKGROUND OF THE INVENTION

Wireless mobile communications provide the greatest convenience for users to access voice and data services essentially anywhere and anytime. Code Division Multiple Access ("CDMA") communication systems are one of the most promising digital wireless communication systems that can provide the desired mix of voice and data services. CDMA modulation techniques permit a large number of system users to communicate with one another.

The geographic coverage provided by the communications system is divided into coverage areas referred to as cells, where each cell corresponds to a base station. The cell may be further divided into multiple sectors. Communication channels allocated to a given cell and/or sector are determined according to various known methods. Each base station transmits a pilot signal that serves as a beacon for mobile units that are in the base station's cell.

At the outset of a mobile call, a typical mobile unit sends out a request for services to a base station over an access channel. In response, the typical base station initiates call set-up by using nominally set initial power levels for traffic channels in the forward link (i.e., base station to mobile unit). The nominally set power levels are adjusted using various closed loop and open loop power control methods. Inappropriate initial power levels, however, present risks in setting up the mobile call. For example, inadequate initial power may lead to bursts of errors, resulting in call quality degradation. In some instances, the call may even be dropped in severely interfered environments because of weak initial power levels. A higher initial power level, however, will cause interference with other users and decrease overall system performance and capacity. A drawback of the existing control methods is that they have slow reaction times and can result in dropped calls.

SUMMARY OF THE INVENTION

The present invention is an apparatus and method for adaptively setting initial power levels in the forward link traffic channels based on an interference measure. The interference measure indicates the losses in the forward link traffic channels due to interference from other base stations, mobile receiver noise and any other source of noise or interference, where the interference measure is the difference between the base station transmitted pilot $E_C/I_O$ and the mobile unit received pilot $E_C/I_O$, and where $E_C/I_O$ is the energy per chip to interference density. The method causes the initial power levels in the traffic channels to be changed in response to the presence of degradation sources. Call quality and system capacity are thus optimized since the initial power level at the base station is set in accordance with the interference environment. Importantly, the present invention is implementable in any CDMA based communication system.

In an exemplary embodiment of the present invention, a mobile station sends out service requests over an access channel to a base station. The access message contains the pilot $E_C/I_O$ received by the mobile unit. The base station extracts the mobile unit received pilot $E_C/I_O$ from the access message transmitted by the mobile unit. An interference measure is then computed by determining the difference between the mobile unit received pilot $E_C/I_O$ from the base station transmitted pilot $E_C/I_O$. The base station then sets the initial power level in the forward link based on the interference measure.

BRIEF DESCRIPTION OF THE DRAWINGS

A more complete understanding of the present invention may be obtained from consideration of the following description in conjunction with the drawings in which.

DETAILED DESCRIPTION

Although the present invention is particularly well suited for a CDMA system and shall be so described, the present invention is equally well suited for use with other communications systems including Wideband CDMA (W-CDMA), as well as other digital and analog transmission methods.

Figure 1:
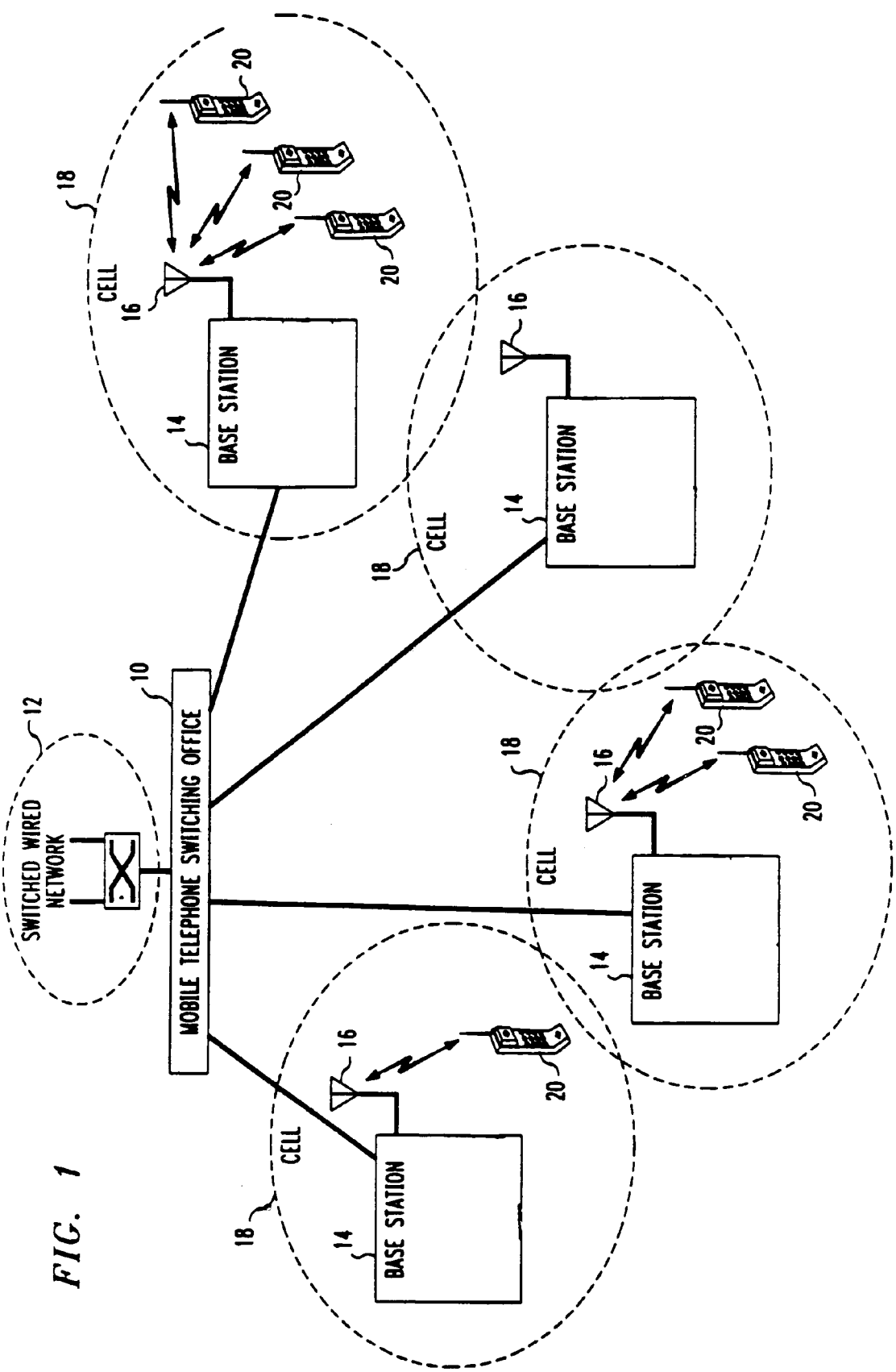
FIG. 1 is a representative block diagram of a typical wireless network.

Referring now to FIG. 1 there is shown a representative block diagram of a typical cellular wireless network. A Mobile Telephone Switching Office ("MTSO") 10, also know as a Mobile Switching Center ("MSC"), provides for switching calls between a cellular network and a switched wired network 12.

MTSO 10 is connected to a plurality of cellular base stations 14. Cellular base station 14 includes a fixed position multi-channel transceiver that is coupled through a radio port to a cellular antenna 16. The geographical area for which cellular base station 14 acts as the communication gateway is called a cell 18. Various cellular base station 14 cells are distributed in suitable locations to form the system coverage. Each cellular base station 14 has an identifiable pilot channel signal that provides a beacon for any cellular mobile units, mobile stations or mobile units 20 that are in cell 18. Mobile unit 20 communicates with cellular base station 14 within cell 18 through a forward link (base station to mobile) that includes a pilot channel and multiple traffic channels, and a reverse link (mobile to base station) that includes multiple traffic channels and access channels.

In the exemplary communications system, the forward link or downlink channels includes a pilot channel, a synchronization channel and multi-purpose channels. The multi-purpose channels can be used for forward traffic, but a certain number are used as paging channels. The reverse link or uplink channels include traffic channels and access channels. The access channel enables mobile unit 20 to communicate non-traffic information, for example, to originate calls and to respond to paging.

In response to a service request over the access channel from mobile unit 20 (also referred to as sending an access probe), base station 14 will initiate call setup processing by transmitting to mobile unit 20 a traffic channel assignment, along with other parameters. This forward link base station transmission, in typical systems, is set at an initial or nominal power level that does not account for the interference environment. As a result, a mobile call can be highly degraded or even dropped due to weak power levels.

Figure 2:
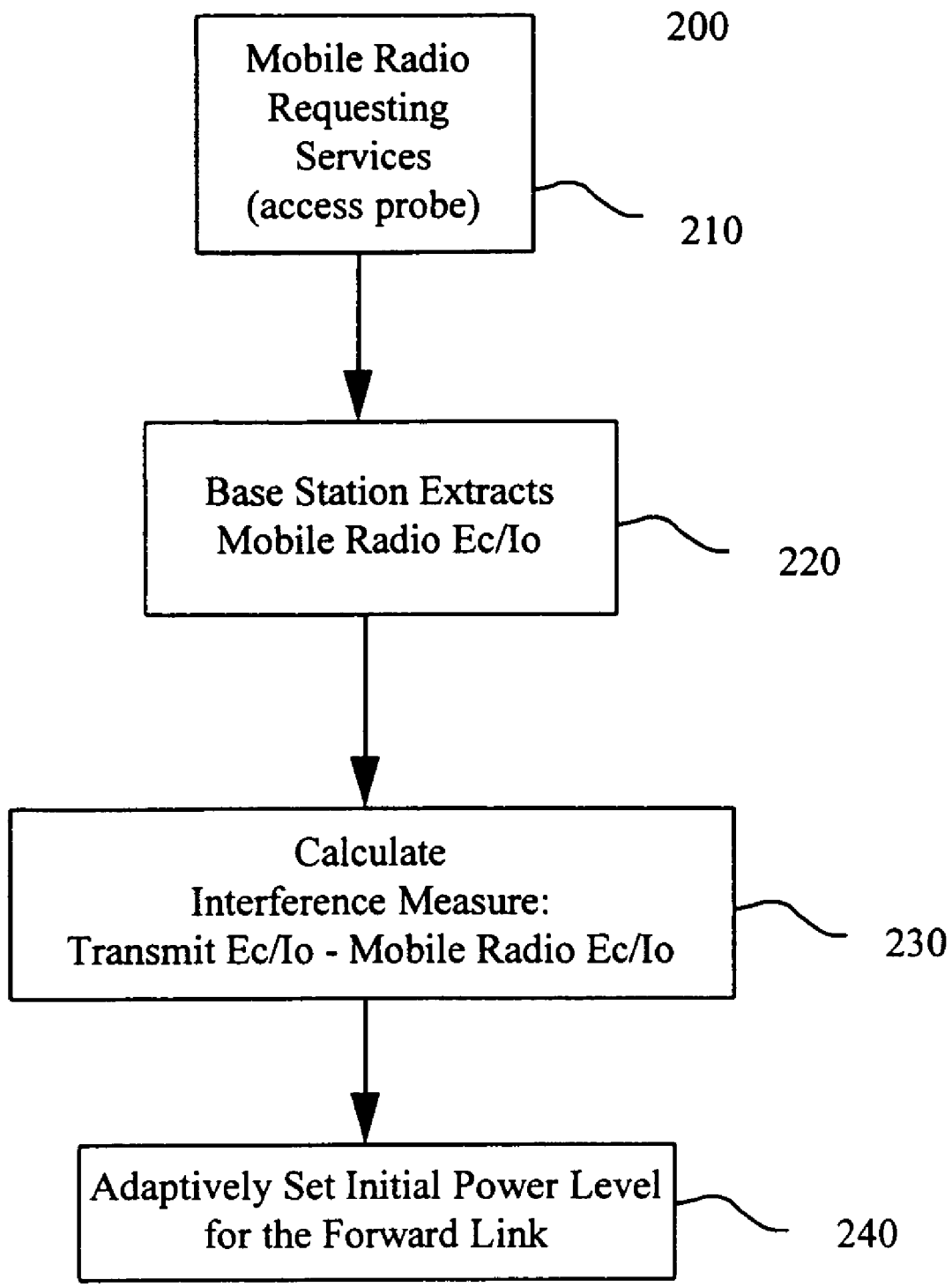
FIG. 2 is an exemplary flowchart of how a mobile unit communicates with a base station.

FIG. 2 is a flow chart 200 illustrating the method for setting up a call in accordance with the invention. Specifically, base station 14 will initiate call setup processing in response to an access probe from mobile unit 20 (step 210). Base station 14 will then advantageously use the mobile unit received pilot $E_C/I_O$ parameter that is available in the access probe transmission to adaptively set the initial power level (step 220). Specifically, several new messages have been proposed for incorporation within the IS-95B standard to aid in CDMA based system hand-offs. Although the information was initially intended for hand-offs, the mobile unit received pilot $E_C/I_O$ parameter can be beneficially used by the method of the invention to set the initial power levels in the forward link traffic channel. See, for example, "Inter-frequency Hard Hand-off Improvements (Rev. 2)," to TR45.5, TR45.5.3.1/97.03.20.02, submitted on Mar. 20, 1997, by Edward Tiedemann and Tao Chen, and a contribution entitled "Proposed IS-95B Text for Inter-Frequency Hard Hand-off Improvements," to TR45.5, TR45.5/97.03.20.03, submitted on Mar. 17–21, 1997, by Pradeep Jain, et al.

Base station 14 of the present invention calculates an interference measure by computing the difference between the mobile unit received pilot $E_C/I_O$ from the base station transmitted pilot $E_C/I_O$, where $E_C/I_O$ is the energy per chip to interference density (step 230). In equation form:

Interference Measure=$T_X E_C/I_O$ (dB)–$R_X E_C/I_O$ (dB)

where $T_X E_C/I_O$ is the transmit pilot $E_C/I_O$ in the base station and varies according to forward link loading; and $R_X E_C/I_O$ is the mobile received pilot $E_C/I_O$ The interference measure indicates the losses in the forward link traffic channels due to interference from other base stations, mobile receiver noise and any other source of noise or interference. Specifically, the interference measure indicates the level of interference present from other base stations that the mobile unit encounters in demodulating the pilot signal from the desired base station. This interference measure is then used by base station 14 to adaptively set the initial power levels on the forward link traffic channel (step 240). If the interference measure indicates a high level of interference, a higher initial power level is set for the forward link traffic channel and vice versa. In an exemplary embodiment, the function relating the initial power level and the interference measure is linear. Other monotonic functions are usable in alternate embodiments for expressing the relationship between the initial power level and the interference measure. For example, a look-up table indexed by the interference measure can be used to determine the initial power level of the forward traffic channel. In an alternate embodiment, the base station could send the transmitted pilot $E_C/I_O$ to the mobile unit, which could then proceed to do the above computations. This would be then sent to the base station to set the initial power levels.

By using the adaptive power level setting method of the invention, system capacity is increased and power is conserved in the forward link. This is especially important for IS-95 conforming communication systems where the forward link power control processing is very slow. Using the proper initial power level is critical in power/interference savings, which in turn results in improved system capacity. Call quality and call survival are improved since the initial power level is set in accordance with the interference environment.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. In a wireless communications system having a base station and a mobile unit, a method for setting initial power levels between the mobile unit and the base station upon receipt of a service request, said method comprising the steps of:

receiving, at the base station, a value of a first power in a request for services transmission from the mobile unit, calculating, at the base station, an interference measure based on the first power, where the first power is the power of a pilot signal received at the mobile unit; and setting an initial power level in a forward link based on said interference measure.

2. The method according to claim 1, wherein said step of calculating determines a difference between the first power and a second power, where the second power is the power of the pilot signal transmitted from the base station.

3. The method according to claim 2, wherein the first power and the second power are defined by the ratio $E_C/I_O$, and wherein each said $E_C/I_O$ represents a ratio between energy per chip to interference density.

4. The method according to claim 1, wherein said interference measure indicates interference levels due to other base stations and mobile receiver noise.

5. The method according to claim 1, wherein said interference measure is linearly related to said initial power level.

6. The method according to claim 1, wherein said interference measure is monotonically related to said initial power level.

7. The method according to claim 1, further comprising:

receiving, at the base station, a value of the first power in an access channel transmission from the mobile unit.

8. In a wireless communications system having a base station and a mobile unit, a method for setting up a call between the mobile unit and the base station, said method comprising the steps of:

receiving a request for services over an access channel from the mobile unit;

determining an interference measure based on a first power where the first power is the power of a pilot signal received at the mobile unit, a value of the first power being received by the base station over said access channel; and setting an initial power level in a forward link traffic channel transmission based on said interference measure.

9. The method according to claim 8, wherein said step of determining includes the steps of:

extracting the value from transmitted messages in said access channel; and computing a difference between the value and a second power, where the second power is the power of the pilot signal transmitted from the base station.

10. The method according to claim 9, wherein the first power and the second power are defined by the ratio $E_C/I_O$, and wherein each said $E_C/I_O$, represents a ratio between energy per chip to interference density.

11. The method according to claim 8, wherein said interference measure indicates interference levels due to other base stations and mobile receiver noise.

12. The method according to claim 8, wherein said interference measure is linearly related to said initial power level.

13. The method according to claim 8, wherein said interference measure is monotonically related to said initial power level.

14. In a wireless CDMA based communications system having a base station and a mobile unit, a method for setting up a call between the mobile unit and the base station, said method comprising the steps of:

receiving an access probe from the mobile unit;

determining an interference measure based on a first power, where the first power is the power of a pilot signal received at the mobile unit, a value of the first power in said access probe; and setting an initial power level in a forward link traffic channel transmission based on said interference measure.

15. The method according to claim 14, wherein said step of determining includes the steps of:

extracting the value in said access probe; and subtracting the value from a second power, where the second power is the power of the pilot signal transmitted from the base station.

16. The method according to claim 15, wherein the first power and the second power are defined by the ratio $E_C/I_O$, and wherein each said $E_C/I_O$ represents a ratio between energy per chip to interference density.

17. The method according to claim 14, wherein said interference measure indicates interference levels due to other base stations and mobile receiver noise.

18. The method according to claim 16, wherein said interference measure is linearly related to said initial power level.

19. The method according to claim 16, wherein said interference measure is monotonically related to said initial power level.

20. In a wireless communications system having a base station and a mobile unit, a method for setting initial power levels between the mobile unit and the base station, said method comprising the steps of:

receiving, at the base station, a value of a first power in a request for services transmission from the mobile unit;

calculating an interference measure based on the first power, where the first power is the power of a pilot signal received at the mobile unit and a second power, where the second power is the power of the pilot signal transmitted by the base station; and setting an initial power level in a forward link based on said interference measure.

21. The method according to claim 20, wherein said step of calculating determines a difference between the first power and the second power.

22. The method according to claim 21, wherein said mobile unit received pilot power are defined by the ratio $E_C/I_O$, and wherein each said $E_C/I_O$ represents a ratio between energy per chip to interference density.

23. The method according to claim 20, wherein said interference measure indicates interference levels due to other base stations and mobile receiver noise.

24. The method according to claim 20, wherein said interference measure is linearly related to said initial power level.

25. The method according to claim 20, wherein said interference measure is monotonically related to said initial power level.

* * * * *